Nov. 12, 1968    T. J. MALOTT    3,410,306
CONTROL VALVE WITH LOCKOUT ELEMENT
Filed Oct. 27, 1966

INVENTOR
THOMAS J. MALOTT

BY *Dodge and Sons*

ATTORNEYS

# United States Patent Office 3,410,306
Patented Nov. 12, 1968

3,410,306
CONTROL VALVE WITH LOCKOUT ELEMENT
Thomas J. Malott, Kalamazoo, Mich., assignor to General Signal Corporation, a corporation of New York
Filed Oct. 27, 1966, Ser. No. 590,050
5 Claims. (Cl. 137—596.2)

This invention relates to hydraulic control valves and particularly to control valves for power steering systems.

A known power steering system for vehicles includes a source of hydraulic fluid under pressure, a double-acting ram for turning the ground-engaging wheels, a steering control valve, and a negative feedback connection between the control valve and the steered parts of the vehicle. The control valve is shiftable in opposite directions from a neutral position, in which it hydraulically locks the ram by means of sealing lands which overlap the motor passages and in which it unloads the source, to positions in which it delivers fluid from the source to a selected side of the ram and connects the other side of the ram with a tank or reservoir. In order to reduce the deadband of the control valve, it has been proposed to eliminate the overlapping sealing lands and assign the ram-locking function to a separate lock out valve. According to the prior proposal, the lock out valve has a central locking position, in which it isolates both sides of the ram from the main control valve, and is shifted in opposite directions from that position to open communication between the two sides of the ram and the delivery passages of the main valve. The lock out valve is biased to the locking position, and it is shifted to one or the other of its open positions by the differential between the pressures in the delivery passages of the main valve.

Although the prior design just mentioned is effective to reduce deadband, systems using this valve can produce objectionable jerks or shocks, particularly when they are used on vehicles, such as articulated loaders, in which the mass of the parts moved by the steering ram is large. I have discovered that this condition is attributable to the fact that the lock out valve responds very rapidly to a decrease in the pressure differential created by the main control valve and moves quickly to its locking position whenever the main valve returns to its neutral position. When the position of the ground-engaging wheels is changed, the steered parts of the vehicle usually overshoot the desired new position and tend to oscillate in a damped manner about this position before they come to rest. However, since the feedback connection returns the main control valve to neutral position as soon as the steered parts reach the desired position, and this causes the lock out valve to close immediately and hydraulically lock the ram, the moving masses are not damped in the normal manner but come to a sudden stop. The accompanying shock or jerk can be severe enough to cause sustained oscillations of the machine.

A similar objectionable shock is encountered when the operator suddenly shifts the main valve through the neutral position to effect a rapid reversal in the steering direction while the wheels are turning. Under these conditions, the lockout valve shifts from one to the other of its two open positions, and, during the short time required for it to travel through its central position, it hydraulically locks the ram. Since the ram and the parts which it controls are moving at this instant, the momentary lock creates a shock.

The object of this invention is to provide an improvement in control valves of the type described above which eliminates the shock problem. According to the invention, the control valve incorporates a lockout valve which moves in only one direction from its locking position to open communication between the delivery passages of the main valve and the opposite sides of the ram, and this lockout valve is provided with a damping device which retards its closing movement in relation to that of the main valve. The degree of damping provided is sufficient to insure that the lockout valve will remain open while oscillatory motion of the steered parts of the vehicle is being damped naturally to an acceptable amplitude, and therefore the objectionable shock previously encountered at the end of a steering maneuver is eliminated. Furthermore, since the new lockout valve has but a single open position, and thus need not move through a central locking position as the main valve is moved between positions at opposite sides of its neutral position, and since the damping device produces a time lag between the closing movements of the lock out and main valves which allows the lockout valve to remain open for a short time after the main valve is in neutral position, it should be evident that the improvement of this invention does not produce a shock when the operator suddenly changes the direction of movement of the steered parts.

The preferred embodiment of the invention is described herein in detail with reference to the accompanying drawing in which.

Figures 1, 2:
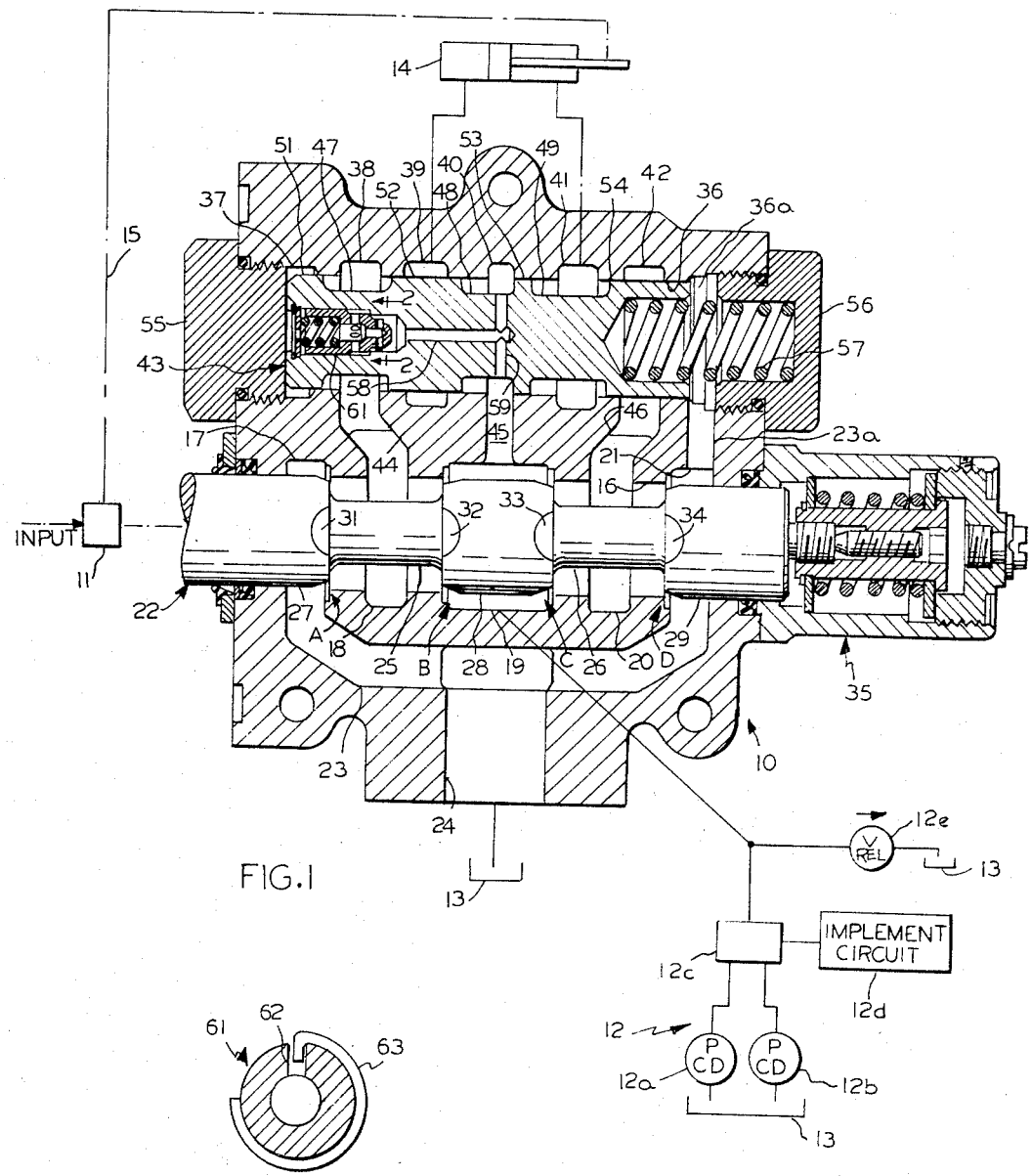
FIG. 1 is a sectional view of the steering control valve including, in schematic form, the various system components with which it is used.
FIG. 2 is a sectional view on enlarged scale taken on line 2—2 of FIG. 1.

As shown in FIG. 1, the improved control valve 10 is incorporated in a steering system which includes a steering linkage 11 through which the operator actuates the control valve, a source 12 of hydraulic fluid under pressure, a hydraulic reservoir or tank 13, a double-acting ram 14 which turns the ground-engaging wheels (not shown), and a negative feedback connection 15 between the ram 14 and the steering linkage 11. Source 12, which preferably supplies valve 10 with fluid at a constant rate, comprises a pair of fixed displacement pumps 12a and 12b which are driven by the propulsion engine (not shown), and a regulating valve 12c of the type disclosed in my co-pending application Ser. No. 528,700, filed Feb. 21, 1966. The regulating valve passes to control valve 10 the total output of pump 12a and a portion of the output of pump 12b which varies inversely with engine speed. The excess fluid delivered by pump 12b is diverted to the vehicle's implement circuit 12d.

Control valve 10 includes a conventional metering valve which consists of a through valve bore 16 which is encircled by annular chambers 17–21 and which contains a sliding valve plunger or spool 22. Annular chamber 19 is connected with source 12 through an inlet port (not shown), while annular chambers 17 and 21 are interconnected by a manifold 23 which leads to the exhaust port 24. Chambers 18 and 20, on the other hand, define the delivery passages of the metering valve and lead to the opposite sides of ram 14 through the lock out valve described below. Valve spool 22 is connected with the steering linkage 11 and is formed with a pair of annular grooves 25 and 26 that define three valve lands 27–29. The right edge of land 27 is provided with four circumferentially spaced, inclined metering flats 31 which, with the wall of bore 16, define a control orifice A. Lands 28 and 29 are provided with similar flats 32–34 that define three additional control orifices B, C and D. When valve spool 24 is in the illustrated neutral position, which is established by the null-adjusting device 35, all of the orifices are open, but, when the spool is shifted in opposite directions from this position, either orifices A and C or orifices B and D are closed. These control orifices are so shaped that the differential between the pressures in delivery chambers 18 and 20 varies linearly with movement of spool 22.

The lock out valve portion of control valve 10 comprises a through valve bore 36 which is encircled by annular chambers 37–42, and which contains a sliding valve spool 43. Annular chambers 38, 40 and 42 are connected with the annular chambers 18, 19 and 20, respectively, of the metering valve by cored passages 44–46, and the chambers 39 and 41 are connected with the flow lines leading to the opposite sides of ram 14 by a pair of motor or service ports (not shown). The right end 36a of bore 36 is in continuous and free communication with exhaust port 24 via an extension 23a of manifold 23, annular chamber 21, and manifold 23. Valve spool 43 is formed with three annular grooves 47, 48 and 49 which define four lands 51–54, and is adapted to move between two limiting positions in which its opposite ends abut the plugs 55 and 56. A coil compression spring 57 biases valve spool 43 to the left to the illustrated locking position, and in this position lands 52, 53 and 54 isolate chambers 39 and 41 from each other and from the other fluid-containing spaces in valve 10. Valve spool 43 is shifted to the right, to the open position in which groove 47 interconnects chambers 38 and 39 and groove 49 interconnects chambers 41 and 42, by the differential between the fluid pressures in annular chamber 37 and in the right end 36a of bore 36. The differential required to shift spool 43 to this open position is slightly higher, for example, 30 p.s.i. higher, than the pressure differential which exists between annular chamber 19 and exhaust port 24 when spool 22 is in neutral position.

Annular chamber 37 is connected with the inlet chamber 19 of the metering valve via axial and radial passages 58 and 59 formed in spool 43, annular chamber 40, and cored passage 45. Axial passage 58 contains a one-way flow restrictor in the form of a spring-biased check valve 61 containing a restricted by-pass passage 62. The flow restriction in this passage is defined by the inturned end of a wire ring 63 which encircles the nose of the check valve (see FIG. 2). The one-way flow restrictor constitutes a unidirectional damping device which retards movement of spool 43 toward, but not away from, the locking position. The amount of damping provided depends upon such factors as the mass of the steered parts, joint friction and tire size, and can be varied by changing the diameter of the wire used in ring 63.

It is desirable to have the damping device act unidirectionally rather than bi-directionally because this insures that, at the beginning of a steering maneuver, a supply path to ram 14 will be opened at approximately the same time as valve spool 22 commences to restrict the open center unloading path for source 12. With this arrangement, the load on the source 12 is kept well below the maximum permitted by the system relief valve 12e except in those unusual cases in which the maximum pressure is required in order to move the wheels. In contrast, if opening movement of valve spool 43 were retarded so that this valve opens communication between the delivery chambers 18 and 20 and the opposite sides of ram 14 after closure of the unloading path begins, source 12 would always be subjected to a substantial load at the commencement of a steering operation.

Control valve 10 also includes a pair of criss cross relief valves which are interposed in passages extending between annular chambers 39 and 41, and which serve to relieve the shock loads which can be imposed on ram 14 when lock spool 43 is in its locking position. These parts are not illustrated here because they are conventional and are not necessary to an understanding of the present invention.

*Operation*

When control valve 10 is in use, its ports and the valve spool 22 are connected with the other system components in the manner illustrated in FIG. 1. With valve spool 22 in the illustrated neutral position, the fluid delivered to inlet chamber 19 by source 12 will pass to tank 13 along two parallel, open center flow paths; one path including orifice B, groove 25, orifice A, annular chamber 17, manifold 23, and exhaust port 24, and the other path including orifice C, groove 26, orifice D, annular chamber 21, manifold 23, and exhaust port 24. These two paths are essentially unrestricted so the differential between the pressures in inlet chamber 19 and the connected chamber 37, on the one hand, and exhaust port 24, on the other hand, will be small. Therefore, spring 57 will hold valve spool 43 in the illustrated position and ram 14 will be hydraulically locked.

When the operator rotates the steering wheel in the direction to turn the ground-engaging wheels to the right, valve spool 22 is shifted to the right to reduce the flow areas of orifices A and C and thereby raise the pressure in annular chambers 18 and 19 relative to the pressure in exhaust port 24. This pressure change is immediately transmitted to annular chamber 37, and, since the one-way flow restrictor for spool 43 permits essentially free flow from inlet chamber 19 to chamber 37 through cored passage 45, annular chamber 40, radial and axial passages 59 and 58, and check valve 61, valve spool 43 shifts rapidly to its open position against the opposition of spring 57. As a result, the fluid which is supplied to chamber 18 through orifice B can flow to the head end of ram 14 via cored passage 44, annular chamber 38, groove 47, and annular chamber 39, and the ram will commence to move the ground-engaging wheels to the right. During this movement, the fluid displaced from the rod end of ram 14 will return to tank 13 via annular chamber 41, groove 49, cored passage 46, annular chamber 20, orifice D, annular chamber 21, manifold 23, and exhaust port 24.

As the ground-engaging wheels commence to turn to the right to the position selected by the operator, feedback connection 15 begins to move valve spool 22 back toward its neutral position. In the usual case the wheels overshoot, i.e., move beyond the desired position. Therefore, feedback connection 15 actually shifts valve spool 22 to a position at the left side of its neutral position and thereby causes it to decrease the flow areas of orifices B and D and raise the pressure in chamber 20 above the pressure in exhaust port 24. Fluid under pressure now is delivered to the rod end of ram 14 through cored passage 46, annular chamber 42, groove 49, and annular chamber 41, and the head end of the ram 14 is vented to tank 13 along a path including chamber 39, groove 47, annular chamber 38, cored passage 44, and annular chamber 18. As a result, ram 14 moves the wheels to the left toward the desired position. The steering system might again cause the wheels to move through the selected position, and, in that event, feedback connection 15 will shift valve spool 12 to the right side of the neutral position and cause it again to pressurize and vent the head and rod ends, respectively of ram 14. This will cause the ram to again drive the wheels to the right. These actuating cycles will be repeated until the oscillation of the steered parts has been completely damped. Although, during this oscillation period, the differential between the pressures in inlet chamber 19 and exhaust port 24 decreases to a low value each time valve spool 22 moves through its neutral position, it does not remain at this low level long enough to permit any appreciable portion of the oil in annular chamber 37 to escape through restricted passage 62. Therefore, lock spool 43 remains in its open position throughout this period and permits the machine to damp naturally in the manner described above.

If the load acting on ram 14 is small, the steered parts will oscillate about a position corresponding to the position of the steering wheel, and the system will ultimately come to rest with the steered parts in that position and the spool 22 in its illustrated neutral position. In this case, the differential between the pressures in chamber 19 and exhaust port 24 will remain at a low level, and spring 57 will return lock spool 43 to its closed or locking position. On the other hand, if ram 14 is under a substantial load, the steered parts will oscillate about, and come to rest in, a position closer to the centered position than the one selected by the operator. Under this condition, spool 22 stops in a position which is located to the right of its neutral position and in which the backpressure developed in chamber 18 by orifice A is just sufficient to enable ram 14 to balance the load. As a result, the pressure in inlet chamber 19 remains substantially higher than the pressure in exhaust port 24, and lock spool 43 remains in its open position. Since ram 14 is not hydraulically locked, road shocks can cause transient changes in the position of the wheels. However, this is no real problem because the wheels usually are maintained in a turned position for only a short period of time, and, since the operator continuously monitors the steering direction during a turn, it is not bothersome for him to apply any needed steering correction.

In order to return the ground-engaging wheels to their straight ahead position, or to execute a left turn, the operator rotates the steering wheel in the counterclockwise direction to thereby shift valve spool 22 to the left side of its neutral position. This action reduces the flow areas of orifices B and D and raises the pressure in chambers 19, 20 and 37 relative to the pressure in exhaust port 24. As a result, lock spool 43 again shifts to its open position, and the rod and head ends of ram 14 are pressurized and vented, respectively. The ram now moves the wheels to the left toward the selected position, and, after an oscillation period similar to the one described previously, the system will come to rest. If the wheels have been moved to the left of the straight ahead or centered position, then, as in the preceding case, the size of the load acting on ram 14 will determine whether or not spool 22 stops in its neutral position and spool 43 is returned to its locking position. On the other hand, if the wheels have been moved only to the centered position, spool 22 will always come to rest in its neutral position, and consequently spring 57 will move lock spool 43 to its closed position. Closure of the lock out valve under this condition is considered essential because the vehicle frequently travels in a straight direction for a prolonged period of time, and thus there is a substantial risk that its wheels will hit an obstruction, and also because the sudden transitory deviations from this particular direction of travel produced by road shocks could be disturbing to the operator and an annoyance to correct.

Since lock spool 43 assumes the same open position regardless of whether main spool 22 is to the right or to the left of its neutral position, and movement of the lock spool away from the open position is retarded by the one-way flow restrictor, it should be evident from the preceding description of operation that this valve will not close, even momentarily, in cases where the operator reverses the direction of steering while the wheels are turning. Because of this, it will be realized that the improved valve 10 also eliminates the shock which previously accompanied this type of steering operation.

As stated previously, the drawing and description relate only to the preferred embodiment of the invention. Since changes can be made in the structure of this embodiment without departing from the inventive concept, the following claims should provide the sole measure of the scope of the invention.

What I claim is:
1. A control valve comprising
    (a) inlet and exhaust passages, first and second delivery passages, and first and second motor passages;
    (b) a metering valve having a neutral position in which it connects each delivery passage with both the inlet passage and the exhaust passage and being shiftable in opposite directions from that position to restrict communication between one or the other of the delivery passages and the inlet passage while restricting communication between the remaining delivery passage and the exhaust passage;
    (c) a two-position lock valve having a closed position in which it isolates each motor passage from the other passages, and an open position in which it connects the first and second motor passages with the first and second delivery passages, respectively;
    (d) actuating means responsive to movement of the metering valve for shifting the lock valve to its closed positoin when the metering valve is moved to its neutral position, and for shifting the lock valve to its open position when the metering valve is moved in either of said opposite directions; and
    (e) means for damping movement of the lock valve from its open position to its closed position so that this movement lags movement of the metering valve to its neutral position.

2. A control valve as defined in claim 1 in which the damping means is unidirectional.

3. A control valve as defined in claim 1 in which
    (a) the actuating means comprises spring means biasing the lock valve toward its closed position, a first fluid pressure motor responsive to the pressure in the exhaust passage and urging the lock valve toward its closed position, a second fluid pressure motor for shifting the lock valve to its open position, and a flow connection between the second fluid pressure motor and the inlet passage; and
    (b) the damping means includes a flow restrictor located in said flow connection.

4. A control valve as defined in claim 3 in which the flow restrictor is a one-way flow restrictor which is arranged to restrict flow from, but not toward, the second fluid pressure motor.

5. A control valve as defined in claim 3 in which
    (a) the lock valve includes a reciprocable valve spool;
    (b) the second fluid pressure motor includes a working chamber at one end of the valve spool and a movable element which is defined by the spool itself;
    (c) the flow connection has a portion which passes through the valve spool; and
    (d) the damping means comprises a check valve located in said portion of the flow connection and arranged to block flow from the working chamber, and a restricted by-pass passage whose ends are connected with said portion on opposite sides of the check valve.

References Cited

UNITED STATES PATENTS

| | | | |
|---|---|---|---|
| 2,472,694 | 6/1949 | Chouings | 91—447 XR |
| 2,958,339 | 11/1960 | Meddock | 137—596.12 |
| 2,959,190 | 11/1960 | Barnes et al. | 91—447 XR |
| 3,049,101 | 8/1962 | Ruhl | 91—447 XR |

HENRY T. KLINKSIEK, *Primary Examiner.*